United States Patent [19]
Plamper

[11] Patent Number: 5,502,958
[45] Date of Patent: Apr. 2, 1996

[54] MOWING BLADE WITH STAR

[75] Inventor: Gerhard Plamper, Valley City, Ohio

[73] Assignee: MTD Products Inc., Cleveland, Ohio

[21] Appl. No.: 364,248

[22] Filed: Dec. 27, 1994

Related U.S. Application Data

[62] Division of Ser. No. 130,713, Oct. 4, 1993.

[51] Int. Cl.$^6$ ................................................... A01D 34/82
[52] U.S. Cl. ........................ 56/17.5; 56/255; 56/DIG. 17
[58] Field of Search ............................ 56/17.5, 255, 295, 56/DIG. 17, DIG. 20

[56] References Cited

U.S. PATENT DOCUMENTS 3,564,824  2/1971  Tygh, Jr. ..................................... 56/295
4,771,593  9/1988  Lee ......................................... 56/17.5 X

FOREIGN PATENT DOCUMENTS 0315602  5/1989  European Pat. Off. ................. 56/295
2707248  8/1978  Germany ............................... 56/295

Primary Examiner—Terry Lee Melius
Attorney, Agent, or Firm—Lightbody & Lucas

[57] ABSTRACT

An improved shape blade bell support for a rotary mowing blade, such blade bell support included on the underside of the mower blade between the blade bolt and blade, such blade bell support including two flexing outer support sections that hold the blade against an adaptor outwardly of the bolt.

25 Claims, 2 Drawing Sheets 5,502,958

MOWING BLADE WITH STAR

This is a divisional application of U.S. Ser. No. 08/130,713 filed Oct. 4, 1993, Mowing Blade With Star, Gerhard Plamper, Inventor.

FIELD OF THE INVENTION

This invention relates to a mowing blade using an asymmetrical star for a power passing interconnection with a rotating blade spindle.

BACKGROUND OF THE INVENTION

For many years, lawn mower blades were simply bolted on to the bottom of a rotating shaft. As the blades themselves were a little more than straight pieces of sharpened stamped steel, and as all of the forces on the blade were unidirectional, this method of interconnection worked quite well.

When the requirements for passing torque between the blade and shaft became bidirectional, as with the addition of a blade brake to the interconnection, and as the blades themselves began to require greater torque, for example mulching blades having integral fans and recutting sections, the simple bolt no longer sufficed. Manufacturers, therefore, adapted any one of many varying techniques in order to physically connect the blade normally to some sort of adapter between the blade and the shaft. These included adapters having pins spaced from the rotational axis of the shaft as well as star shaped holes in the blade with corresponding keys on the shaft.

OBJECTS AND SUMMARY OF THE INVENTION

It is an object of the present invention to provide for a reliable means of passing bidirectional torque between a blade and a shaft.

It is another object of the present invention to increase the longevity of the interconnection between a blade and shaft.

It is yet another object of the present invention to reduce the cost of an interconnection between a blade and shaft.

It is still another object of the present invention to reduce the complexity of the interconnection between a blade and a shaft.

It is a further object of the present invention to simplify the manufacture of an interconnection between a blade and a shaft.

Other objects and a more complete understanding of the invention may be had by referring to the following description and drawings in which:

BRIEF DESCRIPTION OF THE DRAWINGS

The structure, operation, and advantages of the presently disclosed preferred embodiment of the invention will become apparent when consideration of the following description taken in conjunction with the accompanying drawings wherein.

DETAILED DESCRIPTION OF THE INVENTION

Figure 1:
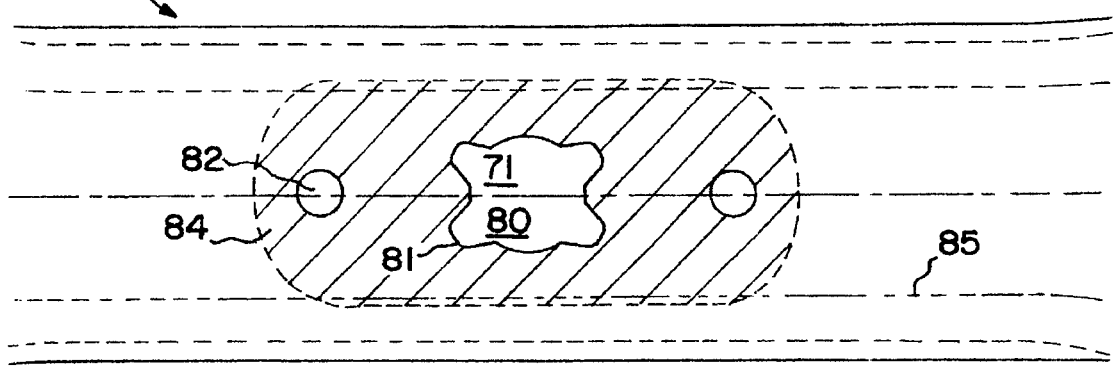
FIG. 1 is a downward view of the center section of a rotary blade incorporating the invention of the application.
Figure 2:
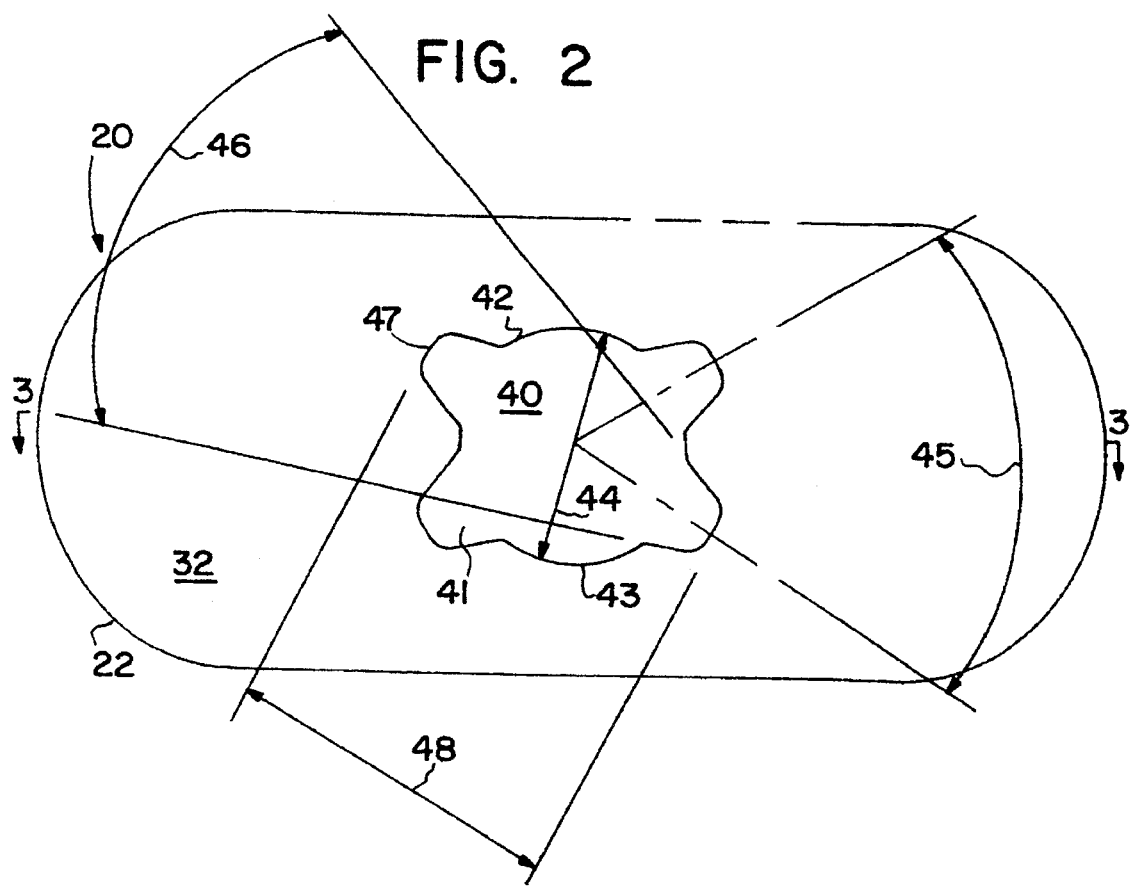
FIG. 2 is an enlarged upward view of the adapter to be utilized with the rotating shaft and the blade of FIG. 1.
Figure 3:
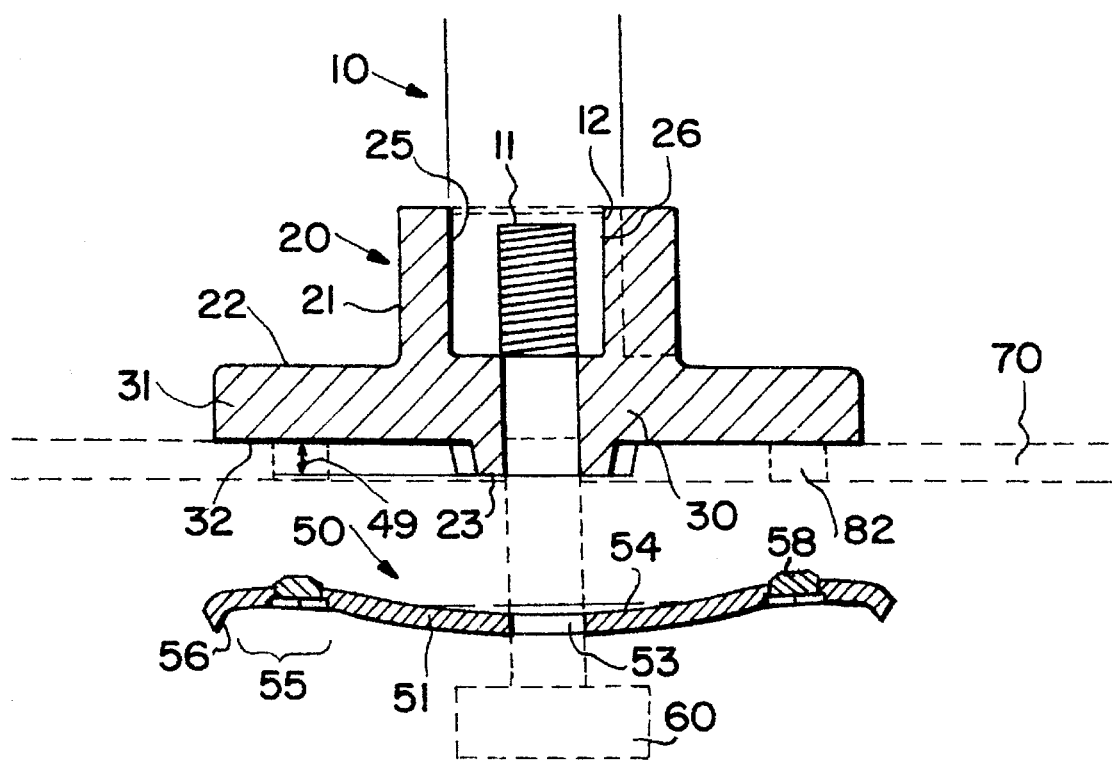
FIG. 3 is a lateral cross sectional view of the adapter of FIG. 2 taken approximately along lines 2—2 thereof. The figure also includes the blade bell support; and, FIG. 4 is a downward view of the blade bell support of FIG. 3 in conjunction with a central sideward cross sectional view thereof.
Figure 4:
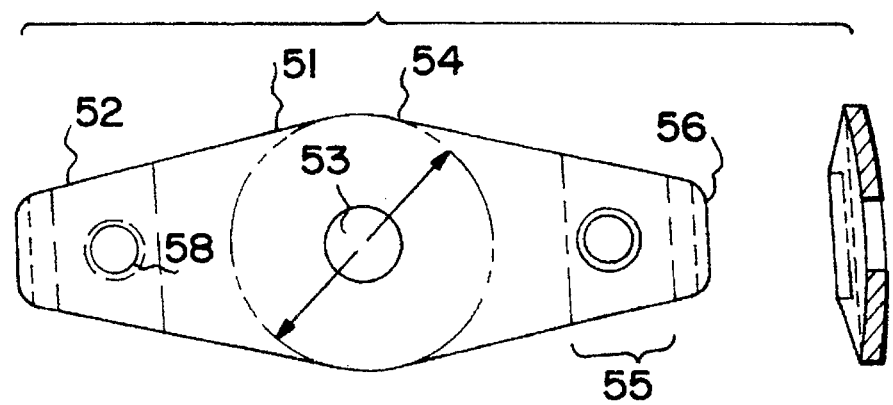

The interconnection of this invention is designed for use with a rotary lawn mower. The rotary lawn mower, which may be single or multiple spindle, includes a shaft 10, a blade adapter 20, a blade bell support 50, and a blade 70.

The spindle 10 is a round shaft that is supported by a bearing assembly (not shown) to a mower deck (also not shown). This shaft, which may be integral with the engine shaft, or which may exist singularly or in spaced multiples, is driven by an engine, normally through some sort of clutch/brake assembly. When the shaft is being rotated by the engine or engine shaft, the torque is passing in one direction from the shaft 10 to the blade 70. When the shaft 10 is braked or otherwise being slowed relative to the blade 70, the torque passes in the opposite direction between the blade 70 and the shaft 10. The torque is thus passed bidirectionally between the shaft 10 and blade 70. The particular shaft disclosed has a threaded hole 11 and a generally rectangular key way 12 formed at its lower end. These are used to interconnect the shaft 10 to the blade adapter 20 as later described. Other means could also be used.

The blade adapter 20 physically interconnects the shaft 10 to the blade 70 in order to pass bidirectional torque therebetween. The particular adapter disclosed is designed for use with the rotary shaft 10 having the threaded hole 11 and the rectangular key way 12 previously described. This adapter 20 includes a mounting section 21, a flange section 22, and a star section 23. This blade adapter is preferably constructed of powder metal. It could also be integral with the shaft 10.

The mounting section 21 includes a circular hole 25 extending therethrough. The cross sectional shape and diameter of this hole 25 is selected to match the cross sectional shape and diameter of the shaft 10 to be utilized with such blade adapter. The particular hole disclosed is thus round with a rectangular key 26 matching generally the shape of the key way 12 on the shaft extending therein. The depth of the hole 25 is selected so as to solidly interconnect the blade adapter 20 to the shaft 10. This is particularly important in respect to angular wobbling due to the high forces which are generated between the shaft 10 and the blade 70. The thickness of the walls of the mounting section 21 are designed with similar thoughts in mind. In the particular embodiment disclosed, the diameter of the hole is approximately 0.875" in diameter with the key way extending approximately 0.075" therein, such key way having a width of approximately 0.1837". The height of the mounting section 20 is approximately 0.80" with a wall thickness of 0.250".

The flange section 22 serves to mechanically interconnect the mounting section 21 with the star section 23 as well as providing an increased angular support for the blade 70.

The central section 30 of the flange section 22 between the star section 23 and the walls of the mounting section 21 passes the torque bidirectionally therebetween.

The remainder of the flange section 22 serves as a physical support for the blade. Theoretically, this support section should be as large as possible within the physical dimensions of the available matching section of the blade.

Such a size would, however, cause a parasitic power loss due to the cross sectional height of this support section 31 as well as potentially compromising the airflows under the mowing deck caused by the blade. The physical dimensions of the support section are therefore chosen in an optimization procedure to provide the necessary angular support for the mower blade while at the same time not unduly compromising the below deck air flow. In the particular embodiment disclosed, the support section is a generally rectangular member having a flat bottom surface 32. This flat bottom surface 32 is selected with a length and a width to match the angular deflection requirements of the blade 70 being utilized with such point adapter 20. As the particular blade 70 is a mulching blade, the matching flat surface on the blade is of a certain distance between the downward extending rounded edge section. This width is slightly less than if the blade width 70 was a conventional discharge blade. The bottom surface 32 of the blade adapter has a width selected to match this flat surface width of the blade 70, thus optimizing the support for torsional bending of the blade (i.e., any further increase in width would not serve the bottom surface 32 under anticipated forces. In the particular embodiment disclosed, the height is approximately 0.38". Note that with this height, the bottom of the hole 25 and the mounting section 21 is located slightly above the top surface of the flange section 22. This slightly strengthens this section by providing a slight angle therebetween, thus increasing the lateral shear strength between the mounting section 21 and the flange section 22.

The star section 23 of the blade adapter 20 is the main mechanical interconnect between the blade adapter 20 and the blade 70. Ideally, this mechanical interconnect should have a solid rotational contact with the blade so as to optimize the torque transfer between the shaft 10 and the blade 70. The star should therefore physical locate the blade against any rotation in respect to the shaft while at the same time maximizing the cross sectional surface area of contact between the star and blade, thus insuring the efficient passage of torque. In addition, preferably the star section would be designed so as to correctly align the blade 70 with the blade adapter 20 under non-skilled attachment. This would allow for the correct positioning of the two components when serviced in the field, thus allowing the manufacturer's design to be continued to be implemented after such servicing. In the particular embodiment disclosed, there are two equally correct positions for the blade 70 in respect to the blade adapter 20, each position 180° opposite the other. In this particular preferred embodiment, the star section 23 has a generally circular profile center section 40 with four protruding asymmetrical teeth 41. These teeth 41 are generally in symmetrical alignment with the longitudinal length of the later described blade, thus optimizing the amount of material between such teeth and the lateral edges of the blade 70.

Central section 40 of the star section 23 primarily provides an access hole for the later described bolt that holds the blade 70 on to the blade adapter 20. The central section 40 also provides for an increased area of contact 42 between the star section and the blade by displacing same from the rotational axis thereof. This area of contact 42 increases the surface area of contact between the star section and the blade, thus increasing the strength of this critical torque passing section. In the particular embodiment disclosed, this central section 40 has a slight outward arc in the middle point 43 of the sides of the star section. This circular area serves to more precisely locate the blade in respect to the star section than an alternate surface would such as a straight edge. The reason for this is that the tolerances for clearances for both the central section and later described teeth can be less if rotary tolerances can be factored out as they can with the preferred shape. This shape also insures that the later described teeth 41 are the primary means to pass the torque between the star section 23 and the blade 70.

The teeth 41 of the star section 23 serve to pass the primary torque between the blade adapter 20 and the blade 70. The teeth 41 in addition aid in insuring the alignment of the blade in respect to the blade adapter. In the particular embodiment disclosed, the teeth 41 are four in number, each angularly displaced symmetrically about the longitudinal axis of the blade 70. With this orientation, the teeth 41 have a to support the blade any further). As width does not generally compromise air flow, this width can be preferably maximized. The width of the blade is selected in an optimization of this need for torsional support. The length of the bottom surface of the blade adapter 20 is designed to minimize an up and down flexing along the length of the mower blade 70. Ideally, to accomplish this purpose, the length would match the length of the flat surface of the blade 70, thus optimizing this functioning. However, such a length would, as previously discussed, potentially compromise the air flow under the mower deck as well as producing parasitic power losses due to an increased cross sectional area. The length is thus chosen in an optimization procedure to provide a sufficient longitudinal angular flexing support for the blade while at the same time minimizing parasitic type losses. In the embodiment shown, this means the length of the blade adaptor 70 is approximately ⅙ of the length of the blade.

In the preferred embodiment disclosed, the support section of the blade adapter has a width of 1.38" a length of 3.30" with the ends rounded with approximately a 0.69 radius. This radiusing of the ends is designed to eliminate a point to point contact which could otherwise occur at the outer ends of the blade adapter on any flexing and/or torsional movement of the blade. Rounded corners are also easier to construct in the powder metal construction utilized for this particular blade adapter 20. The height of the flange section 22 is selected in order to retain the bottom surface 32 flat in contradiction to the torsional and angular forces produced by the blade 70. Ideally, the height is selected so as to produce no flexing of maximum amount of metal on the width of the blade 70 to pass torque to/from the blade 70 given the usage of four teeth. In addition, the orientation of the teeth 41 in this manner increases the critical width of contact along the length of the blade 70, thus lowering the amount of force which has to be passed per unit area. In the particular embodiment disclosed, the central section 40 is approximately 0.685" in circular diameter 44. The teeth 41 are angled with an angle approximately 30° off the longitudinal axis of the blade 70 and an angle 45 of approximately 60° between their center lines, each tooth having a side profile angle 46 of 40°. The end of each tooth 47 is approximately 0.141" in width. Each tooth extends approximately 0.157" off of the central section 40, with the total length 48 across opposing teeth being approximately 1". The total height 49 of the tooth is approximately 0.147". Due to the circular profile of the center section 40, these teeth 41 pass the torque between the star section 23 and the blade 70. In that the teeth 41 are displaced by a maximal distance from the coextensive rotational axis, this maximizes torque transfer.

The blade bell support is designed to cooperate with the bottom surface 32 of the blade adapter 20 to physically support the blade 70 in respect to such blade adapter 20. Due to the desire for both angular and torsional support, it is preferred that the blade bell support cooperate with the bottom surface 32 to hold the blade 70 near the ends of the length of the blade adapter 20. This provides for a maximum support by optimizing the cooperation between the blade adapter 20 and the blade 70. Further, it is preferred that the contact between the ends of the blade bell support and the blade 70 be slightly inward of the ends of the length of the blade adaptor 20. This moves the point of flexing slightly inward of such ends thus increasing the strength of this interconnection. In the particular embodiment disclosed, the blade bell support in addition acts somewhat like a lock washer.

The particular blade bell support disclosed is a stamped metal part having a center section 51 and two adjoining ends 52. The center section 51 of the blade bell support is a circular recessed section having a uniform radius of depression. With this shape, any contact between the center section 51 and the blade occurs on the outer edges 54 of such center section, an area near the width edges of the bottom surface 32 of the blade adapter 20 when the unit is assembled. This optimizes the support for the blade at two locations near to the practical useable width edges of the blade, thus optimizing support at this particular location. In addition, the recessed center section allows for some tolerances in respect to the height of the star section 23 of the blade adapter versus the thickness of the later described blade 70. Further, since the bolt 60 holding the blade on to the adapter is tightened down against this center section, the recess allows for some slight flexing of the center section on tightening the bolt 60, thus helping to hold the bolt 60 in position against ancillary rotational forces.

The ends 52 of the blade bell support 50 serve to press the blade 70 against the longitudinal ends of the bottom surface 32 of the blade adapter 20. To accomplish this, two support surfaces 55 are located at the ends of the blade bell support between the center section 51 and the outer radiused edges 56. These support surfaces 55 are preferably flattened areas which comprise the uppermost part of the blade bell support. With this orientation, upon tightening the bolt 60 holding the blade and blade bell support to the blade adapter through hole 53, the support surface 55 are the first to contact the blade. On continuing to tighten the bolt 60, the ends 52 of the support flex until the outer edges 54 of the center section 51 bottom against the blade. With this orientation, the blade is primarily held against the bottom surface 32 of the adapter 20 near the ends of the longitudinal length of such bottom surface and secondarily held by the outer edges 54 of the center section. This optimizes the angular support of the blade in respect to the blade adapter. To insure the proper alignment of the blade bell support with the blade 70 and blade adapter 20, two small indexing bumps 58 are formed in these approximate center of the support surfaces 55. These bumps cooperate with holes in the later described blade in order to prevent the rotation of the blade bell support 50 in respect to the blade 70. (As the blade 70 is held in position by the star section of the blade adapter, this also locates the blade bell support 50 in respect to such blade adapter 20). Due to the preferred radiusing of the outer edges 56 of the blade bell support, there is no solid line to line contact between a sharp edge of the blade bell support and the blade 70 at this critical location. This reduces the stress between the blade bell support and the blade at this location. Note that since the support surfaces 55 extend outward of the indexing bumps 58, there is a solid support for the blade 70 on the outside of the holes that cooperate with these indexing bumps. As these holes are points of removal of material, this support on the outside thereof causes any flexing which does occur to occur at a location different than the holes. This reduces the strain on the blade at this critical point.

In the particular embodiment disclosed, the blade bell support has a total length of approximately 3.48" and a total width of some 1.35". The center section 51 of the blade bell support is radiused at approximate 4" radius, with such radius continuing towards the ends 52 for approximately 1". The support surfaces 55 extend for approximately 0.53" in width, with the indexing bumps 58 located approximately 1.250" from the center of the center section 51. Each bump is approximately 0.245" in diameter extending approximately 0.040" from the flat support surfaces 55. The outer radiused edges 56 are radiused at approximately 0.12". The hole 53 in the middle of the center section is approximately 0.385" in diameter. The ends 52 of the blade bell support are approximately 0.60" across. The blade bell support is made out of 12 gauge sterilized spring steel which has been heat treated according to SEAH 713A:44-48RC.

The blade 70 is a rotary mower mowing blade. As such it may take many differing lengths and forms. In the preferred embodiment disclosed, a typical mowing blade would be a mulching mowing blade such as that disclosed in U.S. Ser. No. 08/004,287 filed Jan. 14, 1993, Mulching Blade. With this blade, there is a flat section in the center of the blade, in this particular blade 1.5" wide by 5.2" long. This flat area and the center drive hole of this blade 70 has been adapted to incorporate the invention of this present application. This is accomplished by the inclusion of a star hole into the center of the blade, with indexing holes being located longitudinally spaced therefrom.

The star hole 71 has a shape generally tracking the shape of the star section 23 on the blade adapter. This star hole includes a central section 80 and slots 81. The center section 80 of the star hole 71 matches generally the shape of the central section 40 of the star 23, the major difference being that the center section 80 has a slightly larger diameter so as to provide a clearance to snugly fit over the star. Likewise, the shape of the slots 81 generally match the shape of the teeth 41, again with some size difference so as to provide for a mounting clearance. Two holes 82 are formed in the blade 70 to cooperate with the indexing bumps 58 of the blade bell support 50. In the preferred embodiment shown, the central section 80 has a diameter of approximately 0.702". The slots 81 are angularly located along the center line of the blade separated 30° off of the longitudinal axis of the blade 70 and with approximately 60° between the longitudinal axis of the adjacent slots 81. The slots themselves are formed with a 40° side profile. The end of the slot is practically 0.148" in width, with the slots extending approximately 0.180" off of the center section 80. This provides for a total length across opposing slots 81 of approximately 1.012". The blade has a total depth 89 of approximately 0.125". The shaded area 84 on the blade 70 shows the location of the flat bottom surface 32 of the blade adaptor 20 in respect to the blades profiling (shown with dotted lines 85). With this design, the torque is passed between the star shaped section 23 and the blade 70 optimizing the strength of the interconnection while at the same time maintaining a simplicity of this critical joint. This maximizes the torque passing qualities while minimizing the complexity, thus optimizing this critical joint.

Although the invention has been described in its preferred embodiment with a certain degree of particularity, it is to be understood that numerous changes can be made without deviating from the invention as hereinafter claimed.

What is claimed:

1. In a lawn mower having a shaft driven by an engine and a mower blade affixed by a bolt to the shaft, the shaft having a diameter, the mower blade having a bottom surface, the improvement of a blade bell support, said blade bell support having a length, said length of said blade bell support being greater than the diameter of the shaft, said blade bell support being located between the bolt and the blade, said blade bell support contacting the bottom surface of the mower blade, and said blade bell support cooperating with the bottom surface of the mower blade to support the blade spaced outwards of the shaft.

2. The blade bell support of claim 1 characterized in that said blade bell support has ends of said length of said blade bell support and said ends cooperating with the bottom surface of the blade to support same.

3. The blade bell support of claim 1 wherein the blade has an upper surface and characterized by the addition of an adaptor, means to connect said adaptor to the shaft, said adaptor having a length greater than the diameter of the shaft, and said blade bell support pressing the upper surface of the blade against said adaptor.

4. The blade bell support of claim 2 wherein the bolt is tightened in respect to the shaft and characterized in that said blade bell support has a center section, said center section being recessed in respect to said ends of said length of said blade bell support, and the tightening of the bolt to the shaft flexing said blade bell support.

5. In a lawn mower having a mower blade with a longitudinal axis and a bottom surface, a shaft driven by an engine, an adaptor fixedly attached to the shaft, the adaptor having a bottom surface having a length with the mower blade affixed thereto by a bolt, the improvement of means to locate the blade to the adaptor with the blade's longitudinal axis in line with the length of the adaptor, a blade bell support, said blade bell support having a length, said length of said blade bell support being substantially equal to the length of the adaptor, said blade bell support being located between the bolt and the blade adjacent to the bottom surface of such blade, and said blade bell support contacting the bottom surface of the blade substantially at same length as the ends of the adaptor.

6. The improvement of claim 5 characterized in that the contact between the bottom surface of the blade bell support and the bottom surface of the blade being slightly inwards of the ends of the adaptor.

7. The improvement of claim 5 characterized in that said ends of said blade bell support include support surfaces, and said support surfaces being flattened areas for contacting the bottom surface of the blade, said flattened areas being the uppermost parts of said blade bell support.

8. The improvement of claim 7 characterized by the addition of indexing bumps, said indexing bumps being in said support surfaces, holes, said holes being in the blade, and said indexing bumps being in said holes to locate said blade bell support in respect to the blade.

9. The improvement of claim 7 characterized in that said support surfaces include edges and said edges being downwardly radiused away from the blade.

10. The improvement of claim 8 characterized in that said support surfaces include edges and said edges being downwardly radiused away from the blade.

11. The improvement of claim 7 characterized by the addition of a center section, said center section being between said support surfaces, and said center section being spaced from the blade.

12. In a lawn mower having a mower blade with a longitudinal axis, a shaft driven by an engine, an adaptor fixedly attached thereto having a bottom surface with longitudinal ends and a length, the mower blade affixed to the adaptor by a bolt, the blade having a bottom surface, the improvement of means to locate the blade to the adaptor with the longitudinal axis of the blade aligned with the longitudinal axis of the adaptor, a blade bell support, said blade bell support having two end support surfaces separated by a center section, indexing bumps, said indexing bumps being located in said support surfaces, the blade having indexing holes, and said blade bell support being located between the bolt and the blade with said indexing bumps in said indexing holes in the blade with said support surfaces engaging the bottom surface of the blade.

13. The improvement of claim 12 characterized in that said support surfaces include edges and said edges being downwardly radiused away from the blade.

14. The blade bell support of claim 1 characterized by the addition of a mechanical interconnection means to transfer torque from the shaft to the blade and to correctly align the blade to such shaft.

15. The blade bell support of claim 14 characterized in that said mechanical interconnection means includes teeth.

16. The blade bell support of claim 15 wherein the mower blade has a longitudinal axis and characterized in that said teeth are symmetrically aligned with the longitudinal axis of the mower blade.

17. The blade bell support of claim 1 characterized by said blade bell support having ends and indexing means at said ends to prevent rotation of said blade bell support in respect to the blade.

18. The blade bell support of claim 5 characterized by the addition of a mechanical interconnection means to transfer torque from the adaptor to the blade and to correctly align the blade to such adaptor.

19. The blade bell support of claim 18 characterized in that said mechanical interconnection means includes teeth.

20. The blade bell support of claim 19 wherein the mower blade has a longitudinal axis and characterized in that said teeth are symmetrically aligned with the longitudinal axis of the mower blade.

21. In a lawn mower having a mower blade with a longitudinal axis, a shaft driven by an engine, an adaptor fixedly attached thereto having a bottom surface with longitudinal ends and a length, the mower blade affixed to the adaptor by a bolt, the blade having a bottom surface, the improvement of mechanical interconnection means to locate the blade to the adaptor with the longitudinal axis of the blade aligned with the longitudinal axis of the adaptor and to transfer torque therebetween, a blade bell support, said blade bell support having two substantially flattened end support surfaces separated by a center section, said two end support surfaces being spaced uppermost in respect to said center section, indexing bumps, said indexing pumps being located in said support surfaces, the blade having indexing holes, and said blade bell support being located between the bolt and the blade with said indexing bumps in said indexing holes in the blade with said support surfaces engaging the bottom surface of the blade.

22. The improvement of claim 21 characterized in that said support surfaces include edges and said edges being radiused downwardly of said support surfaces.

23. The blade bell support of claim 21 characterized in that said mechanical interconnection means includes teeth.

24. The blade bell support of claim 23 wherein the mower blade has a longitudinal axis and characterized in that said teeth are symmetrically aligned with the longitudinal axis of the mower blade.

25. The improvement of claim 21 characterized in that said support surfaces have a center and said indexing bumps being in said center of said support surfaces respectively.

* * * * *